US011299662B2

(12) United States Patent
Wagle et al.

(10) Patent No.: US 11,299,662 B2
(45) Date of Patent: Apr. 12, 2022

(54) METHOD TO USE LOST CIRCULATION MATERIAL COMPOSITION COMPRISING ALKALINE NANOPARTICLE BASED DISPERSION AND SODIUM BICARBONATE IN DOWNHOLE CONDITIONS

(71) Applicant: SAUDI ARABIAN OIL COMPANY, Dhahran (SA)

(72) Inventors: Vikrant Wagle, Dhahran (SA); Rajendra Arunkumar Kalgaonkar, Dhahran (SA); Abdullah Al-Yami, Dhahran (SA); Sara Alkhalaf, Alkhobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/922,512

(22) Filed: Jul. 7, 2020

(65) Prior Publication Data
US 2022/0010193 A1 Jan. 13, 2022

(51) Int. Cl.
*C09K 8/504* (2006.01)
*C09K 8/516* (2006.01)

(52) U.S. Cl.
CPC ............ *C09K 8/5045* (2013.01); *C09K 8/516* (2013.01); *C09K 2208/10* (2013.01)

(58) Field of Classification Search
CPC ........ C09K 8/50; C09K 8/504; C09K 8/5045; C09K 8/516; C09K 2208/10; E21B 21/00; E21B 21/003
See application file for complete search history.

(56) References Cited

U.S. PATENT DOCUMENTS

| | | | | |
|---|---|---|---|---|
| 4,732,213 A * | 3/1988 | Bennett | ..................... | C09K 8/50 166/292 |
| 5,268,112 A * | 12/1993 | Hutchins | .................. | C09K 8/50 507/217 |
| 5,320,171 A | 6/1994 | Laramay | | |
| 7,013,973 B2 | 3/2006 | Danican et al. | | |
| 7,458,424 B2 | 12/2008 | Odeh et al. | | |
| 7,934,557 B2 | 5/2011 | Nguyen | | |
| 7,954,549 B2 | 6/2011 | Lende et al. | | |
| 8,741,818 B2 | 6/2014 | Ravi et al. | | |
| 9,045,965 B2 | 6/2015 | Patil et al. | | |
| 9,133,386 B2 | 9/2015 | Kumar et al. | | |
| 10,053,613 B1 | 8/2018 | Kalgaonkar et al. | | |
| 10,113,406 B1 * | 10/2018 | Gomaa | ................... | C09K 8/703 |
| 10,351,755 B2 | 7/2019 | Wagle et al. | | |
| 10,407,609 B2 | 9/2019 | Kalgaonkar et al. | | |
| 2005/0221994 A1 | 10/2005 | Xiang | | |
| 2011/0094746 A1 | 4/2011 | Allison et al. | | |
| 2013/0292120 A1 * | 11/2013 | Patil | ...................... | C09K 8/506 166/293 |
| 2014/0158354 A1 * | 6/2014 | Kumar | .................... | C09K 8/08 166/293 |
| 2016/0201433 A1 * | 7/2016 | Kalgaonkar | ............ | C04B 28/24 166/302 |
| 2017/0137694 A1 | 5/2017 | Van Oort et al. | | |
| 2019/0055456 A1 | 2/2019 | Wagle et al. | | |
| 2019/0161668 A1 | 5/2019 | Wagle et al. | | |
| 2019/0276724 A1 | 9/2019 | Wagle et al. | | |
| 2019/0375977 A1 | 12/2019 | Kalgaonkar et al. | | |

FOREIGN PATENT DOCUMENTS

| | | |
|---|---|---|
| WO | 2013/165717 A1 | 11/2013 |
| WO | 2015/041703 A1 | 3/2015 |
| WO | 2018/144663 A1 | 8/2018 |
| WO | 2019/051140 A1 | 3/2019 |
| WO | 2019/051142 A1 | 3/2019 |

OTHER PUBLICATIONS

Stenstrøm, Henrik, "Nano silica treated water based drilling fluid formulation and analysis in various polymers and salts systems", Master's Thesis, Universtiy of Stavanger, Dec. 21, 2015 (150 pages).
International Search Report for corresponding International Application No. PCT/US2020/045354, dated Apr. 1, 2021 (6 pages).
Written Opinion for corresponding International Application No. PCT/US2020/045354, dated Apr. 1, 2021 (8 pages).

* cited by examiner

*Primary Examiner* — Angela M DiTrani Leff
(74) *Attorney, Agent, or Firm* — Osha Bergman Watanabe & Burton LLP

(57) ABSTRACT

Provided is a lost circulation material that may consist essentially of an alkaline nanosilica dispersion and a sodium bicarbonate activator. Further provided are methods that may control lost circulation in a lost circulation zone in a wellbore by introducing the lost circulation material such that it contacts the lost circulation zone and forms a gelled solid in the lost circulation zone.

16 Claims, No Drawings

METHOD TO USE LOST CIRCULATION MATERIAL COMPOSITION COMPRISING ALKALINE NANOPARTICLE BASED DISPERSION AND SODIUM BICARBONATE IN DOWNHOLE CONDITIONS

FIELD OF DISCLOSURE

One or more embodiments of the present disclosure generally relates to lost circulation material (LCM) and use of the LCMs in downhole conditions. LCMs described herein may be used in the oil and gas drilling industries, or other suitable industries that may drill wellbores like oil wells and gas wells.

BACKGROUND

In wellbore drilling, a drilling fluid (or drilling mud) is circulated from a surface of the wellbore to downhole through the drill string. The fluid exits through ports (or jets) in the drill bit. The fluid picks up cuttings and carries the cuttings up an annulus formed between an inner wall of the wellbore and an outer wall of the drill string. The fluid and the cuttings flow through the annulus to the surface, where the cuttings are separated from the fluid. The fluid can be treated with chemicals and then pumped into the wellbore through the drill string to repeat the process.

During the drilling of subterranean wells, such as subterranean wells used in hydrocarbon development operations, the wellbore of the subterranean well can pass through a zone that has induced or natural fractures, are cavernous, or otherwise have an increased permeability compared with solid rock. Such a zone is known as a lost circulation zone. In such a case, the drilling mud and other fluids that are pumped into the well can flow into the lost circulation zone and become irretrievable. Thus, lost circulation is a situation in which the flow of the drilling fluid up the annulus toward the surface is reduced or is totally absent.

When unacceptable drilling fluid losses are encountered, lost circulation materials (LCM) are introduced into the drilling fluid from the surface. The revised fluid that includes the lost circulation materials is pumped downhole as part of the standard well circulation system. The revised fluid passes through a circulation port to plug and pressure seal the exposed formation at the point where losses are occurring. Once sealing has occurred and acceptable fluid loss control is established, drilling operations can resume.

BRIEF SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

One or more embodiments provides a lost circulation material composition that may include an alkaline nanosilica dispersion and a sodium bicarbonate activator. The sodium bicarbonate activator may be present in an amount in a range of 1 to 40 weight percent (wt %) of the lost circulation material.

In one or more embodiments, a method to use the lost circulation material composition may include controlling lost circulation in a lost circulation zone in a wellbore. The method may include introducing the lost circulation material composition, consisting essentially of an alkaline nanosilica dispersion and a sodium bicarbonate activator, into the wellbore. In the wellbore, the alkaline nanosilica dispersion and the activator contact the lost circulation zone. The sodium bicarbonate activator may be present in an amount in a range of 1 to 40 wt % of the lost circulation material. In some embodiments, the alkaline nanosilica dispersion and the sodium bicarbonate activator may not be premixed. Following contact in the lost circulation zone, a gelled solid is formed from the lost circulation material in the lost circulation zone, reducing or eliminating lost circulation.

In one or more embodiments, a method to use the lost circulation material composition may include controlling lost circulation in a lost circulation zone in a wellbore. The method may include introducing the lost circulation material composition, consisting essentially of an alkaline nanosilica dispersion and a sodium bicarbonate activator, into the wellbore. In the wellbore, the alkaline nanosilica dispersion and the activator contact the lost circulation zone. The sodium bicarbonate activator may be present in an amount in a range of 1 to 40 wt % of the lost circulation material. In some embodiments, the alkaline nanosilica dispersion and the sodium bicarbonate activator may be premixed before introduction into the wellbore, and following introduction of the mixture into the wellbore, a gelled solid is formed from the lost circulation material in the lost circulation zone.

Other aspects and advantages of this disclosure will be apparent from the following description made with reference to the accompanying appended claims.

DETAILED DESCRIPTION

One or more embodiments in accordance with the present disclosure relate to lost circulation materials and methods to use such lost circulation materials (LCM) in downhole conditions. More specifically, embodiments herein are directed to convertible compositions and methods for producing a solid gel based lost circulation material from the convertible composition. In particular, embodiments herein are directed toward a convertible composition including an alkaline nanosilica and producing a solid gel based lost circulation material by contacting the alkaline nanosilica with a chemical activator.

In one or more embodiments, the convertible composition includes an alkaline silica nanoparticle dispersion and the chemical activator is a sodium bicarbonate activator. The combination of alkaline silica nanoparticle dispersion and sodium bicarbonate activator forms a gelled solid based LCM. In one or more embodiments, the sodium bicarbonate acts as an activator that gels the nanosilica dispersion.

The formation of gels using the combination of nanosilica dispersions and sodium bicarbonate according to embodiments herein may decrease loss of drilling fluids in any suitable type of lost circulation zone. As used throughout, "lost circulation zone" refers to an area encountered during drilling operations where the volume of drilling fluid returning to the surface is less than the volume of drilling fluid introduced to the wellbore. The lost circulation zone can be due to any kind of opening between the wellbore and the subterranean formation. Lost circulation zones that can be addressed by the solid gel based lost circulation material from a convertible composition described herein can range from minor lost circulation or seepage loss to complete fluid loss.

For instance, minor lost circulation and seepage lost circulation is generally less than 10 barrels per hour (bbl/hr). However, minor lost circulation and seepage lost circulation can be greater or less than 10 bbl/hr depending on the base components of the drilling fluid and other suitable conditions. One of skill in the art would appreciate the various conditions that can define a minor or seepage lost circulation event.

"Moderate lost circulation" is a term for any lost circulation between seepage lost circulation and severe lost circulation and consists of any medium rate of lost circulation, for example, between 10 to 100 barrels per hour (bbl/hr), 10 to 50 barrels per hour (bbl/hr), or 10 to 30 barrels per hour (bbl/hr).

"Severe lost circulation" is a term including any suitable high rate of lost circulation. Non-limiting examples of severe loss circulation include greater than 100 barrels per hour (bbl/hr), greater than 50 barrels per hour (bbl/hr), or greater than 30 barrels per hour (bbl/hr).

In one or more embodiments, the alkaline nanosilica may be introduced into the wellbore such that the alkaline nanosilica contacts the lost circulation zone. Subsequently, the sodium bicarbonate activator may be introduced into the lost circulation zone in downhole conditions to contact the nanosilica dispersion. Contact of the sodium bicarbonate activator with the alkaline nanosilica results in the formation of a gelled solid formed from the reaction of the alkaline nanosilica and the sodium bicarbonate, reducing the rate of lost circulation in the lost circulation zone.

In other embodiments, the alkaline nanosilica and the sodium bicarbonate activator may be mixed and then subsequently introduced into the lost circulation zone. The mixture thus introduced to the lost circulation zone may form a gelled solid, resulting in decreased fluid loss.

In some embodiments, the gelling time (the time for which the nanosilica dispersion begins to form a gel) of the alkaline nanosilica dispersion may be controlled. For example, the gelling time may be affected by the concentration of sodium bicarbonate used. The gelling tendency of the system may be accelerated by changing the pH of the system from alkaline to acidic, where the more acidic the system, the faster the gel formation occurs. The amount of sodium bicarbonate used, for example, may thus depend upon the method used for introduction of the LCM into the lost circulation zone; when pre-mixed, a longer gel time may be desirable. In one or more embodiments, the time to form a gelled solid is from 6-24 hours, from 12-24 hours, from 6-12 hours, from 1-24 hours, or from 1-12 hours.

In at least one embodiment of the method to produce a solid gel lost circulation material, when a lost circulation zone is encountered, a convertible composition pill is produced by mixing the alkaline nanosilica dispersion and the sodium bicarbonate activator. The convertible composition pill can be introduced into the wellbore. The convertible composition pill can be allowed to migrate to the lost circulation zone. The volume of the convertible composition pill can be based on the size of the lost circulation zone, as estimated based on the volume of lost drilling fluid. The amount of chemical activator can be based on the desired gel formation time. The solid gel lost circulation material then forms in the lost circulation zone and the solid gel lost circulation material fills the lost circulation zone, reducing or eliminating fluid loss. Similar considerations and effects may be use in other embodiments where the alkaline nanosilica is introduced to the wellbore in a first pill prior to contact of the nanosilica with the sodium bicarbonate activator, introduced in a second pill.

Embodiments herein may be useful over a wide range of downhole conditions, including temperatures of up to 200° C., for example.

As described above, lost circulation materials according to embodiments herein may be formed from an alkaline silica nanoparticle dispersion and a sodium bicarbonate activator.

Alkaline silica nanoparticles useful according to embodiments herein may include nanoparticles formed from any type of alkaline silicate, including sodium silicate and potassium silicate, among others. In some embodiments, the alkaline nanosilica dispersion does not include sodium silicate (i.e., is in the absence of sodium silicate).

The alkaline nanosilica dispersion may be a nanosilica particle composition having a pH between 9 and 11. In one or more embodiments, the alkaline nanosilica dispersion may have a pH between 9.5 and 10.5, when measured at room temperature.

The alkaline silica nanoparticle may have any suitable particle size for the application, including: 0.1-1000 nm, 500-1000 nm, 0.1-500 nm, 1-300 nm, 10-200 nm, 10-70 nm, 20-100 nm, 30-80 nm, 40-70 nm, 40-60 nm, and 40-50 nm. The nanoparticles as provided may have a particle size distribution, which may be monodisperse or polydisperse.

In some embodiments, the alkaline silica nanoparticles may have a particle size between 1 nanometers (nm) and 100 nm, such as between 5 nm and 95 nm. In some embodiments the alkaline silica nanoparticles may be between 5 nm and 50 nm, alternately between 5 nm and 20 nm, alternately between 20 nm and 40 nm, alternately between 40 nm and 60 nm, alternately between 60 nm and 80 nm, and alternately between 80 nm and 100 nm. The alkaline silica nanoparticles can have a greater surface area than silica particles; silica particles have a particle size in the range between 5 microns (5000 nm) and 100 microns (100,000). The surface area of alkaline silica nanoparticles may be between 100 square meters per gram ($m^2/g$) and 500 $m^2/g$, alternatively between 100 $m^2/g$ and 200 $m^2/g$, alternatively between 200 $m^2/g$ and 300 $m^2/g$, alternatively between 300 $m^2/g$ and 400 $m^2/g$, and alternatively between 400 $m^2/g$ and 500 $m^2/g$. Without being bound to a particular theory, the greater surface area of the alkaline silica nanoparticles can affect the rate of gelation and the nature of the gels formed. More specifically, the smaller particle size of the alkaline silica nanoparticles in the alkaline nanosilica dispersion promotes faster gelling than silica particles.

The concentration of the alkaline silica nanoparticles in the alkaline nanosilica dispersion may be between 5 percent by weight (wt %) and 60 wt %. The concentration of nanosilica in the alkaline nanosilica dispersion may affect the rate of gel formation, the greater the concentration of nanosilica in the alkaline nanosilica dispersion the faster rate of gel formation. The amount of the alkaline nanosilica dispersion added to the aqueous based drilling mud may depend on the mud weight of the aqueous based drilling mud. The concentration of the alkaline nanosilica dispersion in the nanosilica dispersion can be between 5 wt % and 50 wt %, such as in the range from 20 wt % to 50 wt %, or in the range from about 25 wt % to about 50 wt %, or in the range from about 35 wt % to about 45 wt % or 40 wt % to 50 wt %.

Formation of a gel according to embodiments herein may be initiated by contact of the above-described alkaline silica nanoparticles with an activator. Activators useful according to embodiments herein may include or comprise sodium bicarbonate. In other embodiments, the activator may consist of or consist essentially of sodium bicarbonate.

The activator (sodium bicarbonate) may be used at a weight ratio to the alkaline nanosilica dispersion in a range from 0.01:1 to 1:1. As noted above, the ratio of the activator to the alkaline nanosilica may impact the gelation time. Regarding the weight ratio of sodium bicarbonate activator to alkaline nanosilica dispersion, the top of the range is called the upper limit and the bottom of the range is called the lower limit. In some embodiments, the sodium bicarbonate activator may be present in an amount in a range from 1 wt % to 40 wt % of the lost circulation material (inclusive of the sodium bicarbonate and the alkaline nanosilica dispersion); such as from a lower limit of 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, or 25 wt % to an upper limit of 20 wt %, 21 wt %, 22 wt %, 23 wt %, 24 wt %, 25 wt %, 26 wt %, 27 wt %, 28 wt %, 29 wt %, 30 wt %, 35 wt %, or 40 wt %, where any lower limit may be combined with any mathematically compatible upper limit.

In some embodiments, the sodium bicarbonate activator may be used at a weight ratio to the alkaline nanosilica in a range from about 1:1 to about 1:3. In other embodiments, the sodium bicarbonate may be used at a weight ratio to the alkaline nanosilica in a range from about 1:1.5 to about 1:2.5, such as from about 1:1.6 to about 1:2.

As noted above, the nanosilica dispersion may have an initial pH of greater than 9. The sodium bicarbonate may decrease the pH of the dispersion, causing the alkaline nanosilica to aggregate, resulting in the formation of a solid gel. The rate and/or relative amount of sodium bicarbonate may impact the time for a solid gel to form within the wellbore, filling the lost circulation zone.

One or more embodiments of the LCM composition also includes a base material additive commonly found in LCM materials. Suitable additives include one or more not limited to the following: polymers, corn stalks, rice hulls, cotton burrs, corn cobs, tree bark, animal hair, mineral fibers, citrus pulp, shredded paper, ground peanut shells, mica flakes, mica, fibrous material, cellophane, walnut shells, flaky material, plastic pieces, marble, wood, wood chips, formica, plant fibers, cottonseed hulls, ground rubber, polymeric materials, and nut hulls, among other LCM materials commonly used in the art.

In other embodiments, however, it has been found that a loss control material consisting essentially of an alkaline nanosilica dispersion and a sodium bicarbonate activator may effectively and efficiently form a gel sufficient for reducing lost circulation. In one or more other embodiments, it has been found that a loss control material consisting essentially of an alkaline nanosilica dispersion, a sodium bicarbonate activator, and a viscosifier may be used for reducing lost circulation.

The convertible composition contains less than 5% by weight salts, according to one or more embodiments herein. In other embodiments, the convertible composition may contain less than 4% by weight salts, less than 3% by weight salts, less than 2% by weight salts, less than 1% by weight salts, or less than 0.1% by weight salts. In one or more embodiments, the convertible composition contains less than 0.1% by weight salts. Salts in the convertible composition can result in untimely conversion of the convertible composition into the solid gel lost circulation material.

EXAMPLE

Example 1: 80 grams of alkaline nanosilica dispersion was taken in a beaker. The nanosilica (IDISIL SI 4545) used in one or more embodiments was obtained from Evonik Industries (Essen, Germany) Typical properties of alkaline nanosilica dispersion used in one or more embodiments is given in Table 1.

TABLE 1

| Particle size-Titrated (nm) | % SiO2 | pH@ 25° C. | Specific gravity (g/ml) | Visual appearance |
|---|---|---|---|---|
| 45 | 45% | 9-11 | 1.32 | white/off-white |

20 grams of sodium bicarbonate was added to the 80 g of alkaline nanosilica dispersion in the beaker. The dispersion was mixed well using a stirrer. The nanosilica dispersion along with sodium bicarbonate was subjected to static aging at 250° F. for 16 hours. After 16 hours of static aging, the nanosilica dispersion was converted into a solid.

As described above, embodiments herein are directed toward a lost circulation material including an alkaline nanosilica dispersion and sodium bicarbonate. The lost circulation material utilizes network structures formed from the alkaline nanosilica and sodium bicarbonate gelled material. The nanosilica gelling may advantageously be controlled by varying the relative concentration of the sodium bicarbonate activator, allowing the gel to selectively form in the lost circulation zone. Further, the gelling tendency of the system can be accelerated by changing the pH of the system. Additionally, such gels formed may be used at elevated temperatures and advantageously utilizes environmentally friendly ingredients. Even further, it is theorized that use of such a lost circulation material or a pill containing such a lost circulation material may be compatible with any suitable type of drilling fluid.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A lost circulation material, consisting essentially of:
   a lost circulation material gel that is (a) and (b) in combination, where
   (a) is an alkaline nanosilica dispersion,
      wherein the alkaline nanosilica dispersion comprises 30-50 wt % of alkaline silica nanoparticles, and
   (b) is a sodium bicarbonate activator,
      wherein the sodium bicarbonate activator is present in an amount in a range of 19 wt % to 40 wt % of the lost circulation material.

2. The lost circulation material of claim 1, wherein the alkaline nanosilica dispersion comprises alkaline silica nanoparticles having a size in a range from about 10 nm to about 70 nm.

3. The lost circulation material of claim 1, wherein the alkaline nanosilica dispersion comprises alkaline silica nanoparticles having a size in a range from about 40 nm to about 50 nm.

4. The lost circulation material of claim 1, wherein a weight ratio of the sodium bicarbonate activator to the alkaline silica nanoparticles is in a range from about 1:1 to about 1:3.

5. The lost circulation material of claim 1, wherein the alkaline nanosilica dispersion has a pH in a range from 9.5 to 10.5, and wherein the alkaline nanosilica dispersion is in the absence of sodium silicate.

6. The lost circulation material of claim 1, wherein the sodium bicarbonate activator is present in an amount in a range of 19 wt % to 35 wt %.

7. The lost circulation material of claim 1, wherein the sodium bicarbonate activator is present in an amount in a range of 20 wt % to 35 wt %.

8. A method of controlling lost circulation in a lost circulation zone in a wellbore, comprising:
   introducing a lost circulation material consisting essentially of an alkaline nanosilica dispersion and a sodium bicarbonate activator into the wellbore such that they contact the lost circulation zone,
   wherein the alkaline nanosilica dispersion comprises 30-50 wt % of alkaline silica nanoparticles,
   wherein the sodium bicarbonate activator is present in an amount in a range of 19 wt % to 40 wt % of the lost circulation material,
   wherein the alkaline nanosilica dispersion and the sodium bicarbonate activator are not premixed, and
   forming a gelled solid from the lost circulation material in the lost circulation zone.

9. The method of claim 8, wherein formation of the gelled solid occurs within 6-24 hours.

10. The method of claim 8, wherein the alkaline nanosilica dispersion comprises alkaline silica nanoparticles having a size in a range from about 10 nm to about 70 nm.

11. The method of claim 8, wherein a weight ratio of the sodium bicarbonate activator to the alkaline silica nanoparticles is in a range from about 1:1 to about 1:3.

12. The method of claim 8, wherein the alkaline nanosilica dispersion has a pH in a range from 9.5 to 10.5.

13. A method of controlling lost circulation in a lost circulation zone in a wellbore, comprising:
   introducing a lost circulation material consisting essentially of an alkaline nanosilica dispersion and a sodium bicarbonate activator into the wellbore such that they contact the lost circulation zone,
   wherein the alkaline nanosilica dispersion comprises 30-50 wt % of alkaline silica nanoparticles,
   wherein the sodium bicarbonate activator is present in an amount in a range of 19 wt % to 40 wt % of the lost circulation material, and
   forming a gelled solid from the lost circulation material in the lost circulation zone.

14. The method of claim 13, wherein the alkaline nanosilica dispersion comprises alkaline silica nanoparticles having a size in the range from about 10 nm to about 70 nm.

15. The method of claim 13, wherein a weight ratio of the sodium bicarbonate activator to the alkaline silica nanoparticles is in a range from about 1:1 to about 1:3.

16. The method of claim 13, wherein the alkaline nanosilica dispersion has a pH in a range from 9.5 to 10.5.

* * * * *